United States Patent
Kraus et al.

(10) Patent No.: US 11,441,058 B2
(45) Date of Patent: Sep. 13, 2022

(54) DISPERSION ADHESIVES

(71) Applicant: Covestro Intellectual Property GmbH & Co. KG, Leverkusen (DE)

(72) Inventors: Harald Kraus, Leverkusen (DE); Robert Liberati, Hürth-Efferen (DE); Peter Kueker, Leverkusen (DE); Martin Melchiors, Leichlingen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/274,812

(22) PCT Filed: Sep. 25, 2019

(86) PCT No.: PCT/EP2019/075849
§ 371 (c)(1),
(2) Date: Mar. 10, 2021

(87) PCT Pub. No.: WO2020/064829
PCT Pub. Date: Apr. 2, 2020

(65) Prior Publication Data
US 2021/0317351 A1    Oct. 14, 2021

(30) Foreign Application Priority Data

Sep. 27, 2018   (EP) .................................... 18197310

(51) Int. Cl.
*C09J 175/06*       (2006.01)
*B32B 7/12*         (2006.01)
(Continued)

(52) U.S. Cl.
CPC .............. *C09J 175/06* (2013.01); *B32B 7/12* (2013.01); *B32B 37/1284* (2013.01);
(Continued)

(58) Field of Classification Search
CPC ..... C09J 175/06; C09J 11/08; B32B 37/1284; B32B 7/12; B32B 2037/1269; B32B 2479/00; B32B 2037/1253; C08K 5/0016
See application file for complete search history.

(56) References Cited

U.S. PATENT DOCUMENTS

2011/0082236 A1*  4/2011  Erdem ................... C09J 175/04
                                                              524/507
2014/0249267 A1*  9/2014  Kraus ................ C08G 18/4202
                                                              524/591

(Continued)

FOREIGN PATENT DOCUMENTS

CN       106590506 A     4/2017
DE       2446440 A1      4/1976
(Continued)

OTHER PUBLICATIONS

PCI, "Novel PUDs for Use in Coating Application", Paint & Coating Industry, Jun. 2004, https://www.pcimag.com/articles/84769-novel-puds-for-use-in-coating-applications. (Year: 2004).*

(Continued)

*Primary Examiner* — Michael N Orlando
*Assistant Examiner* — Christopher W Raimund
(74) *Attorney, Agent, or Firm* — Jed C. Benson

(57) ABSTRACT

The invention relates to formulations of aqueous dispersion adhesives on the basis of aqueous polyurethane or polyurethane-urea dispersions and the use of the adhesive formulations for bonding foam substrates according to the spray coagulation method.

9 Claims, 1 Drawing Sheet

(51) Int. Cl.
*B32B 37/12* (2006.01)
*C08K 5/00* (2006.01)
*C09J 11/08* (2006.01)

(52) U.S. Cl.
CPC ............ *C08K 5/0016* (2013.01); *C09J 11/08* (2013.01); *B32B 2037/1253* (2013.01); *B32B 2037/1269* (2013.01); *B32B 2479/00* (2013.01)

(56) References Cited

U.S. PATENT DOCUMENTS

| | | | |
|---|---|---|---|
| 2015/0037555 A1* | 2/2015 | Mai ................... | B32B 37/1207 428/217 |
| 2015/0079339 A1 | 3/2015 | Covelli et al. | |
| 2015/0337185 A1 | 11/2015 | Sherman et al. | |
| 2016/0375450 A1 | 12/2016 | De et al. | |
| 2017/0173858 A1* | 6/2017 | Sellin ..................... | B29C 65/02 |
| 2017/0369624 A1* | 12/2017 | Zhao ........................ | C08L 23/00 |
| 2018/0010024 A1* | 1/2018 | Lu ..................... | C08G 18/4211 |
| 2018/0320036 A1* | 11/2018 | De Block .............. | C08K 5/101 |
| 2018/0371147 A1* | 12/2018 | Tonhauser ......... | C08G 18/3221 |

FOREIGN PATENT DOCUMENTS

| | | |
|---|---|---|
| WO | 2013053786 A1 | 4/2013 |
| WO | 2014182170 A1 | 11/2014 |

OTHER PUBLICATIONS

International Search Report, PCT/EP2019/075849, dated Dec. 3, 2019, Authorized officer: Ute Neugebauer.

* cited by examiner

DISPERSION ADHESIVES

CROSS-REFERENCE TO RELATED APPLICATION

This application is a national stage application under 35 U.S.C. § 371 of PCT/EP2019/075849, filed Sep. 25, 2019, which claims the benefit of European Application No. 18197310.8, filed Sep. 27, 2018, each of which is incorporated herein by reference.

FIELD

The invention relates to formulations of aqueous dispersion adhesives based on aqueous polyurethane or polyurethane-urea dispersions, to a process for preparing same, and to the use of the dispersion adhesives for the adhesive bonding of foam substrates by the spray coagulation process.

BACKGROUND

When adhesively bonding foam substrates to other substrates, for example for the combinations foam-foam, foam-wood and foam-plastic, use is predominantly made of polychloroprene dispersion adhesives in a spray coagulation process. In this process, the adhesive and a coagulant are conveyed separately into a spray gun, mixed in the spray jet and coagulated. As the mixing does not take place until in the spray jet, no pot life needs to be taken into account. In addition, the coagulated adhesive remains on the substrate surface to be adhesively bonded and only diffuses to a minor extent, if at all, into the pore structure of the foam substrates. This frequently achieves high initial strengths, sufficiently long open times and good heat resistances.

Important fields of application for this spray coagulation process are the production of mattresses and seating furniture. In particular from Scandinavian countries, there is a demand for chlorine-free alternatives to the polychloroprene dispersion adhesives, in order for example to be able to satisfy the requirements of the Nordic Ecolabel. In addition, they should feature high initial strengths, a sufficiently long open time and good heat resistances. Since the production of seating furniture, in particular of office chairs, frequently involves using nonpolar substrates such as polypropylene substrates or particle-filled polypropylene substrates, sufficiently good adhesion is required not only for the adhesive bonding of foam on foam and foam on wood, but in particular also for the adhesive bonding of foam on nonpolar surfaces.

Adhesives based on aqueous polyurethane dispersions have become established worldwide in demanding industrial applications, for example in the case of shoe manufacturing, the bonding of parts for motor vehicle interiors, sheet lamination or the adhesive bonding of textile substrates.

In the case of the use of such adhesives based on aqueous polyurethane dispersions for bonding substrates, this is usually carried out after the heat-activation process. In this case, the dispersion is applied to the substrate and, after complete evaporation of the water, the adhesive layer is activated by heating, for example using an infrared radiator, and is converted into an adhesive state. The temperature at which the adhesive film becomes sticky is referred to as the activation temperature.

However, when using polyurethane or polyurethane-polyurea dispersions, the process of wet bonding can also be used, that is to say the adhesive bonding is effected immediately after application of the adhesive. Mechanical securing of the parts to be joined is in this case necessary until the adhesive has set. This process is often used for the adhesive bonding of wood or textile substrates.

Both the heat activation process and the wet bonding process are of limited suitability for the adhesive bonding of foam substrates. The slow evaporation of the water, in particular, requires long waiting times between application of the adhesive and the bonding process, or appropriate drying installations. In addition, a not insignificant portion of the adhesive can diffuse into the pores of the foam substrates prior to or during the drying and is then no longer available for the actual bonding.

The adhesives based on aqueous polyurethane dispersions which have become established on the market are in general unsuitable for the use of the spray coagulation process, since they frequently do not coagulate sufficiently quickly and, in particular on difficult substrates such as for example foams having a high restoring force, do not display sufficient adhesion and strength. Since the dispersion polymers contain urethane and urea groups as polar groups and also ionic or nonionic hydrophilizing groups, only insufficient adhesion, if any, is achieved in particular when adhesively bonding foam on polypropylene substrates.

WO 2013/053786 A1 describes aqueous polyurethane dispersions, the polymer of which has a melting temperature in the range from 30° C. to 50° C., determined by differential scanning calorimetry in accordance with DIN 65467 at a heating rate of 20 K/min, wherein the polymer is obtainable from two dissimilarly crystallizing polyester polyols in specified quantitative ratios. These polyurethane dispersions are primarily suitable as cold contact adhesives, but can also be employed using spray coagulation processes. However, the strengths achievable thereby are insufficient for most foam bonding applications. No sufficient adhesion is achieved on nonpolar surfaces in particular.

Luphen® D DS 3548 from BASF AG (Ludwigshafen, Germany) provides an epoxy resin-modified polyurethane dispersion which inter alia is reportedly also suitable for the spray coagulation process. The basis of the epoxy resin used here is bisphenol A diglycidyl ether. Since bisphenol A and the conversion products formed therefrom are viewed in an extremely critical manner in particular by end consumers in respect of a possible effect on the endocrine system and accordingly are generally rejected, the market is demanding adhesives and other products which are free from bisphenol A.

WO 2014/182170 A1 describes performing the spray coagulation process using a particular airless spray process. To this end, mixtures both of polychloroprene dispersions and tackifier dispersions and also of polyurethane dispersions and tackifier dispersions are used. However, these are not specified further in this document. Fields of application mentioned are foam adhesive bonds in the mattress and furniture manufacturing sector. The document likewise fails to describe how to achieve adhesion on nonpolar surfaces.

US 2015/0079339 A1 describes multilayer articles, also consisting inter alia of foam substrates, which are produced by adhesive bonding using a polyurethane dispersion in the temperature range from 100 to 200° C. In order to prevent penetration of the adhesive dispersion into the pores of the substrates, coagulants may optionally be added, but a spray coagulation process is not used. There is no indication as to whether adhesion can also be achieved on nonpolar surfaces.

SUMMARY

The object of the present invention was therefore that of providing a chlorine- and bisphenol A-free alternative to polychloroprene dispersion adhesives for the adhesive bonding of foam substrates by the spray coagulation process which does not exhibit the disadvantages of the prior art and which displays sufficient adhesion and strength even on difficult substrates, especially in the case of foams having a high restoring force, and which additionally is distinguished by adhesion on nonpolar surfaces.

It has surprisingly now been found that aqueous adhesive formulations containing a mixture of an aqueous polyurethane or polyurethane-urea dispersion, a plasticizer resin and a tackifier resin are suitable for the adhesive bonding of foam substrates by the spray coagulation process, do not exhibit the disadvantages of the prior art, and also enable adhesive bonding of foam substrates to substrates having nonpolar surfaces.

BRIEF DESCRIPTION OF THE DRAWINGS

Various features and characteristics of the inventions described in this specification may be better understood by reference to the accompanying figures, in which.

DETAILED DESCRIPTION

Figure 1:
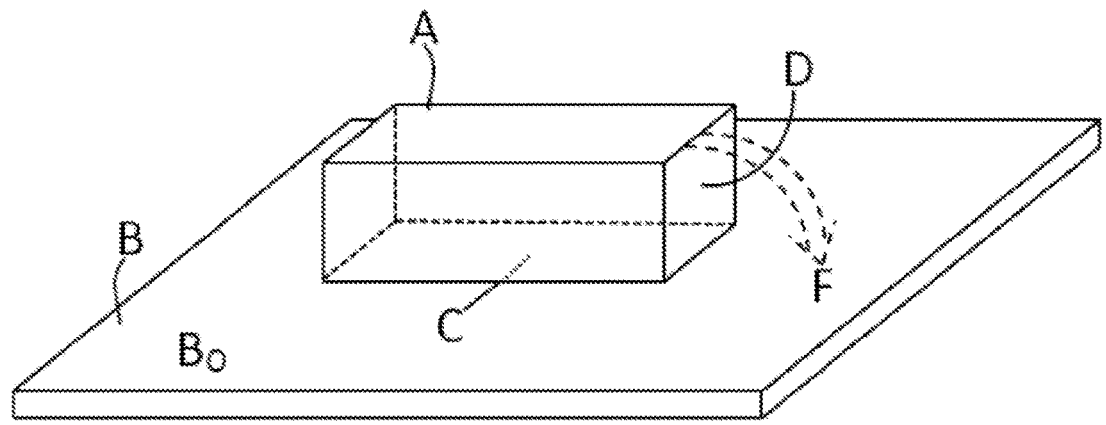
FIG. 1 depicts a foam body adhered to a plastic substrate.

The present invention therefore provides formulations containing a mixture of
I. an aqueous polyurethane or polyurethane-urea dispersion, containing as disperse phase a polymer A) which after drying is semicrystalline or crystalline and has a melting temperature in the range from 30 to 80° C. and an enthalpy of fusion of 35 J/g,
II. at least one plasticizer resin B),
III. at least one tackifier resin C),
characterized in that the mixture, based on the solids present overall, contains
60%-90% by weight of polymer A),
5%-20% by weight of plasticizer resin B) and
5%-20% by weight of tackifier resin C),
and the amounts by weight of A), B) and C) add up to 100% by weight.

The mixture, based on the solids present overall, preferably contains
66%-85% by weight of polymer A),
8%-18% by weight of plasticizer resin B) and
7%-16% by weight of tackifier resin C),
wherein the amounts by weight of A), B) and C) add up to 100% by weight.

The mixture, based on the solids, particularly preferably contains
70%-81% by weight of polymer A),
10%-16% by weight of plasticizer resin B) and
9%-14% by weight of tackifier resin C),
wherein the amounts by weight of A), B) and C) add up to 100% by weight.

In a very particularly preferred embodiment of the present invention, the mixture, based on the solids, contains
72%-80% by weight of polymer A),
10%-15.5% by weight of plasticizer resin B) and
10%-12.5% by weight of tackifier resin C),
wherein the amounts by weight of A), B) and C) add up to 100% by weight.

The dispersions referred to as polyurethane dispersions in connection with the present invention contain as disperse phase polymers which may be polyurethanes in the narrower sense, that is to say those polymers which are obtained by polymerization of polyols and polyisocyanates, but they may also be those in which monoamines and/or diamines are used as formation components, possibly as chain extenders. The dispersions that can be used according to the invention are therefore referred to as aqueous polyurethane or polyurethane-urea dispersions.

A polymer is referred to as semicrystalline or crystalline when it exhibits a melting peak in DSC measurement in accordance with DIN 65467 with a heating rate of 20 K/min. The melting peak is caused by the melting of regular substructures in the polymer. The melting temperature of the polymers or polymer layers obtained from the formulations according to the invention is in this case preferably in a range from 35° C. to 80° C., particularly preferably from 40° C. to 70° C., very particularly preferably from 42° C. to 55° C. The enthalpy of fusion of the polymer layers obtained from the formulations according to the invention is 35 J/g, preferably 40 J/g, particularly preferably 45 J/g. The first heating is evaluated in order to also detect polymers which crystallize slowly.

While the teaching of the present invention can in principle be realized with any dispersed polyurethane or polyurethane-urea polymer as polymer A), according to the invention the polymer A) is preferably formed from
A(i). at least one crystalline or semicrystalline difunctional polyester polyol having a number-average molecular weight of at least 400 g/mol and a melting temperature of at least 35° C. and a heat of fusion of at least 35 J/g,
A(ii). optionally at least one difunctional polyol component having a number-average molecular weight of 62 to 399 g/mol,
A(iii). an isocyanate component,
A(iv). at least one isocyanate-reactive component bearing at least one ionic or potentially ionic group, and
A(v). optionally further isocyanate-reactive components.

The aqueous dispersions of the invention contain 15% to 60% by weight of polymer and 40% to 85% by weight of water, preferably 30% to 50% by weight of polymer and 50% to 70% by weight of water, particularly preferably 40% to 50% by weight of polymer and 50% to 60% by weight water.

The polymer contains 50% to 95% by weight of constituent A(i), 0% to 10% by weight of constituent A(ii), 4% to 25% by weight of constituent A(iii), 0.5% to 10% by weight of constituent A(iv) and 0% to 30% by weight of constituent A(v), wherein the sum total of the constituents adds up to 100% by weight.

In a preferred form of the invention, the polymer contains 65% to 92% by weight of constituent A(i), 0% to 5% by weight of constituent A(ii), 6% to 15% by weight of constituent A(iii), 0.5% to 5% by weight of constituent A(iv) and 0% to 25% by weight of constituent A(v), wherein the sum total of the constituents adds up to 100% by weight.

In a particularly preferred form of the invention, the polymer contains 75% to 92% by weight of constituent A(i), 0% to 5% by weight of constituent A(ii), 8% to 15% by weight of constituent A(iii), 0.5% to 4% by weight of constituent A(iv) and 0% to 15% by weight of constituent A(v), wherein the sum total of the constituents adds up to 100% by weight.

In a very particularly preferred form of the invention, the polymer contains 80% to 90% by weight of constituent A(i), 0% to 3% by weight of constituent A(ii), 8% to 14% by weight of constituent A(iii), 0.5% to 3% by weight of constituent A(iv) and 0% to 10% by weight of constituent A(v), wherein the sum total of the constituents adds up to 100% by weight.

Suitable crystalline or semicrystalline difunctional polyester polyols A(i) are in particular linear or else slightly branched polyester polyols based on dicarboxylic acids and/or derivatives thereof such as anhydrides, esters or acid chlorides and preferably aliphatic linear polyols. Mixtures of dicarboxylic acids and/or derivatives thereof are also suitable. Suitable dicarboxylic acids are, for example, adipic acid, succinic acid, sebacic acid or dodecanedioic acid. Preference is given to succinic acid, adipic acid and sebacic acid and mixtures of these, particular preference is given to succinic acid and adipic acid and mixtures of these, and very particular preference is given to adipic acid. These are used in amounts of at least 90 mol %, preferably of from 95 to 100 mol %, based on the total amount of all carboxylic acids.

The difunctional polyester polyols A(i) can be prepared, for example, by polycondensation of dicarboxylic acids with polyols. The polyols preferably have a molar mass of 62 to 399 g/mol, consist of 2 to 12 carbon atoms, are preferably unbranched, difunctional and preferably have primary OH groups.

Examples of polyols which may be used for the preparation of the polyester polyols A(i) include polyhydric alcohols, such as for example ethanediol, di-, tri-, or tetraethylene glycol, propane-1,2-diol, di-, tri-, or tetrapropylene glycol, propane-1,3-diol, butane-1,4-diol, butane-1,3-diol, butane-2,3-diol, pentane-1,5-diol, hexane-1,6-diol, 2,2-dimethylpropane-1,3-diol, 1,4-dihydroxycyclohexane, 1,4-dimethylolcyclohexane, octane-1,8-diol, decane-1,10-diol, dodecane-1,12-diol or mixtures of these.

Preferred polyol components for the polyester polyols A(i) are ethane-1,2-diol, butane-1,4-diol and hexane-1,6-diol; particular preference is given to butane-1,4-diol and hexane-1,6-diol, very particular preference is given to butane-1,4-diol.

The polyester polyols A(i) may be formed from one or more polyols. In a preferred embodiment of the present invention, they are formed from just one polyol.

If the crystalline or semicrystalline difunctional polyester polyols having a number-average molecular weight of at least 400 g/mol and a melting temperature of at least 35° C. have a heat of fusion of at least 50 J/g, then the polymer prepared using the same regularly has a heat of fusion of 35 J/g. If desired, adjustment of the heat of fusion of the polymer can be achieved by a slight modification of the content of polyester polyol A(i) in the composition or by a small variation of the heat of fusion of the polyester polyol. These measures require only exploratory experiments and are completely within the practical experience of a person of average skill in the art in this field.

The preparation of polyester polyols A(i) is known from the prior art.

The number-average molecular weight of the polyester polyols A(i) is preferably between 400 and 4000 g/mol, more preferably between 1000 and 3000 g/mol, particularly preferably between 1500 and 2500 g/mol, and very particularly preferably between 1800 and 2400 g/mol.

The melting temperature of the crystalline or semicrystalline polyester polyols is generally at least 35° C., preferably between 40 and 80° C., particularly preferably between 42 and 60° C. and very particularly preferably between 45 and 52° C. The heat of fusion is 35 J/g, preferably 40 J/g and particularly preferably 50 J/g.

Examples of difunctional polyol components having a molecular weight of 62 to 399 which are suitable as formation component A(ii) include the polyols mentioned for the preparation of the polyester polyols A(i). Low molecular weight polyester diols, polyether diols, polycarbonate diols or other polymer diols are in principle also suitable, provided they have a molecular weight of 62 to 399 daltons.

Suitable formation components A(iii) are any desired organic compounds having at least two free isocyanate groups per molecule. Preference is given to using diisocyanates $Y(NCO)_2$, where Y is a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms. Examples of such diisocyanates that are preferably to be used include tetramethylene diisocyanate, methylpentamethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane, 4,4'-diisocyanato-2,2-dicyclohexylpropane, 1,4-diisocyanatobenzene, 2,4-diisocyanatotoluene, 2,6-diisocyanatotoluene, 4,4'-diisocyanatodiphenylmethane, 2,2'- and 2,4'-diisocyanatodiphenylmethane, tetramethylxylylene diisocyanate, p-xylylene diisocyanate, p-isopropylidene diisocyanate, and mixtures composed of these compounds.

It is also possible also to use proportions of higher-functionality polyisocyanates known per se in polyurethane chemistry, or else modified polyisocyanates known per se and for example comprising carbodiimide groups, allophanate groups, isocyanurate groups, urethane groups and/or biuret groups.

In addition to these simple diisocyanates, polyisocyanates containing heteroatoms in the radical linking the isocyanate groups and/or having a functionality of more than 2 isocyanate groups per molecule are also suitable. The former are, for example, polyisocyanates which have been prepared by modification of simple aliphatic, cycloaliphatic, araliphatic and/or aromatic diisocyanates, are formed from at least two diisocyanates, and have a uretdione, isocyanurate, urethane, allophanate, biuret, carbodiimide, iminooxadiazinedione and/or oxadiazinetrione structure. One example of an unmodified polyisocyanate having more than 2 isocyanate groups per molecule is 4-isocyanatomethyloctane 1,8-diisocyanate (nonane triisocyanate).

Particularly preferred formation components A(iii) are hexamethylene diisocyanate (HDI) and 1-isocyanato-3,3,5-trimethyl-5-isocyanatomethylcyclohexane (IPDI), and mixtures thereof.

Preferred isocyanate-reactive components A(iv) bearing at least one ionic or potentially ionic group are mono- and dihydroxycarboxylic acids, mono- and diaminocarboxylic acids, mono- and dihydroxysulfonic acids, mono- and diaminosulfonic acids and also mono- and dihydroxyphosphonic acids or mono- and diaminophosphonic acids and alkali metal and ammonium salts thereof. Examples are dimethylolpropionic acid, dimethylolbutyric acid, hydroxypivalic acid, N-(2-aminoethyl)-β-alanine, N-(2-aminoethyl)-2-aminoethanesulfonic acid, N-(2-aminoethyl)-2 aminoethanecarboxylic acid, ethylenediaminepropyl- or -butylsulfonic acid, propylene-1,2- or -1,3-diamine-β-ethylsulfonic acid, malic acid, citric acid, glycolic acid, lactic acid, glycine, alanine, taurine, lysine, 3,5-diaminobenzoic acid, an addition product of IPDI and acrylic acid (EP-A 0 916 647, Example 1) and the alkali metal and/or ammonium salts thereof; the adduct of sodium bisulfite onto but-2-ene-1,4-diol, polyethersulfonate, the propoxylated adduct of 2-butenediol and $NaHSO_3$, described, for example, in DE-A 2 446 440 (pages 5-9, formulae Well-suited for salt formation are hydroxides of sodium, potassium, lithium and calcium and tertiary amines such as triethylamine, dimethylcyclohexylamine and ethyldiisopropylamine. Other amines can also be used for salt formation such as ammonia, diethanolamine, triethanolamine, dimethylethanolamine, methyldiethanolamine, aminomethylpropanol and also mixtures of the specified and also other amines Expediently, these amines are added only after the extensive conversion of the isocyanate groups.

Further suitable as component A(iv) are units which by addition of acids can be converted into cationic groups, such as N-methyldiethanolamine.

Particularly preferred components A(iv) are those having carboxyl and/or carboxylate and/or sulfonate groups.

Very particular preference is given to the sodium salts of N-(2-aminoethyl)-2-aminoethanesulfonic acid and N-(2-aminoethyl)-2-aminoethanecarboxylic acid, especially of N-(2-aminoethyl)-2-aminoethanesulfonic acid. Very particular preference is furthermore given to the salts of dimethylolpropionic acid.

Isocyanate-reactive components A(v) can for example be polyoxyalkylene ethers containing at least one hydroxyl or amino group. The frequently used polyalkylene oxide polyether alcohols are obtainable in a manner known per se by alkoxylation of suitable starter molecules. Alkylene oxides suitable for the alkoxylation reaction are especially ethylene oxide and propylene oxide, which can be used individually or else together in the alkoxylation reaction.

Further examples of isocyanate-reactive components A(v) are monoamines, diamines and/or polyamines, and mixtures thereof.

Examples of monoamines are aliphatic and/or alicyclic primary and/or secondary monoamines such as ethylamine, diethylamine, the isomeric propyl- and butylamines, higher linear aliphatic monoamines and cycloaliphatic monoamines such as cyclohexylamine. Further examples are aminoalcohols, i.e. compounds containing amino and hydroxyl groups in one molecule, such as for example ethanolamine, N-methylethanolamine, diethanolamine or 2-propanolamine. Examples of diamines are ethane-1,2-diamine, hexamethylene-1,6-diamine, 1-amino-3,3,5-trimethyl-5-aminomethylcyclohexane (isophoronediamine), piperazine, 1,4-diaminocyclohexane and bis(4-aminocyclohexyl)methane. Adipic dihydrazide, hydrazine and hydrazine hydrate are furthermore suitable. Further examples are aminoalcohols, i.e. compounds containing amino and hydroxyl groups in one molecule, such as for example 1,3-diamino-2-propanol, N-(2-hydroxyethyl)ethylenediamine or N,N-bis(2-hydroxyethyl)ethylenediamine Examples of polyamines are diethylenetriamine and triethylenetetramine.

In a preferred form of the invention, the polymer according to the invention contains, for adjusting the molar mass, at least one monoamine and/or at least one diamine as isocyanate-reactive component A(v).

The aqueous polyurethane or polyurethane-urea dispersions preferably do not contain any external emulsifiers.

In one particular embodiment of the invention, the polymer A) contains a polyester of adipic acid and butane-1,4-diol as component A(i), butane-1,4-diol as component A(ii), 1-isocyanato-3,3,5-trimethyl-5-isocyanatomethylcyclohexane (IPDI) as component A(iii), the sodium salt of N-(2-aminoethyl)-2-aminoethanesulfonic acid as component A(iv) and diethanolamine as component A(v).

"Plasticizer" designates chemical substances which are added to polymers in order to make them soft, flexible, extensible and supple for use or for further processing.

Plasticizers B) used are non-volatile, low molecular weight compounds bearing polar groups. Preferred plasticizers are di(phenoxyethyl) formal and non-volatile esters based on aromatic carboxylic acids such as phthalic acid, isophthalic acid, terephthalic acid, benzoic acid, trimellitic acid; on aliphatic carboxylic acids such as maleic acid, fumaric acid, succinic acid, acetic acid, propionic acid, butyric acid, adipic acid, azelaic acid, sebacic acid, citric acid, cyclohexanedicarboxylic acid, or on fatty acids such as oleic acid, ricinoleic acid or stearic acid; and phosphoric, sulfonic or alkylsulfonic esters. Preference is also given to epoxidized vegetable oils such as epoxidized linseed oil and epoxidized soybean oil.

Particular preference is given to di(phenoxyethyl) formal, dibutyl terephthalate, alkylsulfonic esters of phenol and esters based on benzoic acid. Very particular preference is given to di(phenoxyethyl) formal, dibutyl terephthalate and dipropylene glycol dibenzoate. In a very particularly preferred embodiment of the present invention, the plasticizer B) used is di(phenoxyethyl) formal.

In a likewise very particularly preferred embodiment of the present invention, the plasticizer B) used is dipropylene glycol dibenzoate.

"Tackifier resins" refer to resins which act as a tackifier and which increase the adhesion capacity of a plastic or of an adhesive.

The tackifier resins C) used may be natural or synthetic resins, for example aliphatic, aromatically modified, aromatic and hydrogenated hydrocarbon resins, terpene resins, modified terpene resins and terpene-phenol resins, or tree resin derivatives such as rosins, modified rosins such as resin esters based on rosin (rosin esters), balsam resin derivatives (gum rosin) and tall oil derivatives (tall oil rosin). The tackifier resins can be used individually or in mixtures.

The tackifier resins C) used are preferably rosins and modified rosins. Particular preference is given to using resin esters based on rosin. The tackifiers can be used as 100% resins or as a dispersion in the formulations according to the invention, so long as compatibility (e.g. stability against phase separation) is provided. In a particularly preferred embodiment of the present invention, as component C), use is made of aqueous dispersions of rosin esters (rosin ester dispersions).

The formulations according to the invention are preferably used for adhesive bonding by the spray coagulation process. In this process, the aqueous adhesive formulations and also a coagulant are conveyed separately into a two-component spray gun and mixed in the spray jet. Spraying is typically effected using atomizer air at 0.1-5 bar of pressure; however, it is also possible to deliver at least one of the two components airlessly, as described for example in WO 2015/137808. The coagulation of the dispersion takes place in the spray jet on the path to the surface of the first substrate; a portion of the water present in the adhesive dispersion already evaporates in the process. On impact, the adhesive polymer forms on the surface of the first substrate a film which is immediately tacky in the still-wet state. As the mixing of adhesive dispersion and coagulant does not take place until in the spray jet, no pot life needs to be taken into account. On account of the tackiness of the polymer film in the wet state, the second surface can be immediately joined, ideally for example with pressure on the substrates towards the adhesive surface. The application of pressure by pressing the two substrate surfaces together is advantageous since it increases the strength of the bond. It is likewise advantageous when at least one of the two substrates is porous or permeable to water, in order to allow for the transport of water away out of the solidifying adhesive joint.

Suitable coagulants include aqueous solutions of salts, preferably of metals of the first, second and third main group of the Periodic Table, in particular if they exhibit a good water solubility. Salts based on divalent or trivalent cations are preferably used. Particular preference is given to using calcium chloride, zinc sulfate or aluminum sulfate. Very particular preference is given to using calcium chloride. Mixtures of different salts as per the above description can also be used as the aqueous solution.

The concentration of the salts in the aqueous salt solutions suitable as coagulant is generally 1% to 20% by weight, preferably 2% to 10% by weight and particularly preferably 3% to 4% by weight. The proportion of the aqueous solution of the coagulant, based on the sum of adhesive solution plus coagulant solution, is between 0.1% and 50% by weight, preferably between 1% and 30% by weight, particularly preferably between 8% and 20% by weight and very particularly preferably between 12% and 18% by weight.

Alternatively, coagulants used may also be aqueous solutions of inorganic or organic acids, preferably citric acid, phosphoric acid or carbonic acid, and mixtures of one or more of the abovementioned salts with one or more of these acids.

The formulations according to the invention are preferably prepared by mixing the aqueous polyurethane or polyurethane-urea dispersion with the plasticizer resin and the tackifier resin. This can be done in any desired sequence. The polyurethane dispersion is preferably initially charged and then the tackifier resin C) and the plasticizer resin B) are added one after the other with stirring. Preference is given here to using stirrers having a sufficiently great introduction of shear force. Suitable stirrers are known to the person skilled in the art or can be determined by simple preliminary experiments.

The adhesive bonds, produced with the formulations according to the invention by the spray coagulation process, display sufficient immediate strengths in the case of foam substrates having a high foam density of 70 kg/m$^3$ and more and therefore an associated high restoring force, and also adhesion to nonpolar surfaces, in particular to polypropylene substrates.

A foam substrate is understood to mean a substrate made of foam, foams generally being synthetically produced substances having a cellular structure and low density. A distinction can be made here between open-cell, closed-cell and mixed-cell foams. Depending on the hardness, foams are divided into rigid and flexible foams. Virtually all plastics are suitable for foaming. An important characteristic of foams is the foam density. This is expressed in kg/m$^3$ and gives the weight of a foam block having an edge length of 1 m. The foam density is considered to be the most important feature for distinguishing between foams, other properties largely depend on it. The higher the foam density, the greater the restoring force and the higher the requirements on the immediate strengths of the adhesives.

In principle, the formulations according to the invention are suitable for the adhesive bonding of all foam substrates by the spray coagulation process. Preference is given to adhesively bonding open-cell and mixed-cell foam substrates. Even foam substrates having a high foam density and high restoring force can be adhesively bonded here.

In a preferred embodiment of the invention, the foam substrate(s) is/are composed of polyurethane (for example polyether and polyester foams) and/or a rubber, such as for example natural rubber (NR), styrene-butadiene rubber (SBR), ethylene-propylene-diene polymer (EPDM), butadiene-acrylonitrile rubber (NBR) or chloroprene rubber (CR).

In a particularly preferred embodiment of the invention, the foam substrate(s) is/are composed of polyurethane.

The formulations according to the invention moreover feature good adhesion to a very wide variety of other substrates, such as for example to wood, paper, leather, textiles, cork, and plastics (thermoplastics, elastomers, thermosets, composites) such as different polyvinyl chloride qualities, polyurethanes, polyvinyl acetate, ABS, rubbers, poly(ethylene-vinyl acetate), polycarbonate or polyolefins, such as for example filled or unfilled polypropylene. Surprisingly, with the formulations according to the invention and even in the case of nonpolar substrates, there is generally no need for any pretreatment of the substrate surface, for example by priming, singeing or corona treatment.

The adhesive compositions, containing the formulations according to the invention, are thus suitable for the adhesive bonding of any desired substrates, preferably formed from the abovementioned materials.

The adhesives according to the invention are particularly suitable for the bonding of foam on foam, foam on wood, foam on various plastics, and of textiles on various substrates.

The adhesive compositions, containing the formulations according to the invention, are very particularly suitable for the bonding of foam on nonpolar substrates, in particular on filled or unfilled polypropylene.

In the furniture industry, especially the seating furniture industry and here in particular in the production of office chairs, this substrate combination is of great significance. Articles typical of the industry, such as chairs, sofas and the like, which have been produced using the formulations according to the invention therefore also fall within the scope of the present invention.

Adhesive composites comprising substrates and sheetlike structures bonded using the formulations according to the invention, are likewise a subject of the present application.

EXAMPLES

The invention will be elucidated in more detail below on the basis of the examples. The following methods and test methods were used here:

A) Spray Coagulation Process:

A standard spray gun for two-component dispersion adhesives, namely the PILOT III 2K from Walther Pilot, is used for application. The adhesive and the coagulant CaCl$_2$) (3% by weight solution in water) are conveyed separately into the spray gun, mixed in the spray jet and the adhesive is coagulated. As the mixing does not take place until in the spray jet, no pot life needs to be taken into account. A ratio of 86% by weight adhesive dispersion and 14% by weight CaCl$_2$) solution was chosen.

The precise settings of the spray gun are known in principle to the person skilled in the art and can be tailored to the specific case without undue burden and determined by simple preliminary experiments. The quantitative ratios and the application weight can be determined by reweighing the reservoir vessel and the substrates.

The following settings were used:
a.) Adhesive component: conveying pressure 1.3 bar
b.) Coagulation component: conveying pressure 0.3 bar
c.) Atomizer air pressure: 2.8 bar
d.) Bore diameter (nozzle) for adhesive component: 1.0 mm e.) Bore diameter (nozzle) for coagulant component: 0.4 mm f.) Application weights: 130-150 g/m² (wet)

B) Determination of the Initial Strength for Foam Substrates Having a High Foam Density and High Restoring Force:

As test material, ST 13070 PU foam bodies from STN Schaumstoff Technik Nurnberg GmbH having the dimensions 10×5×3 cm and a foam density of 70 kg/m³ are used. To assess the initial strength, immediately after application of the adhesive by means of the spray coagulation process (application rate 130-150 g/m² wet), the test specimens are folded in the middle using light palm pressure and joined together. The initial strength is sufficient if the test specimen does not open up in spite of the restoring forces arising.

Figure 2:
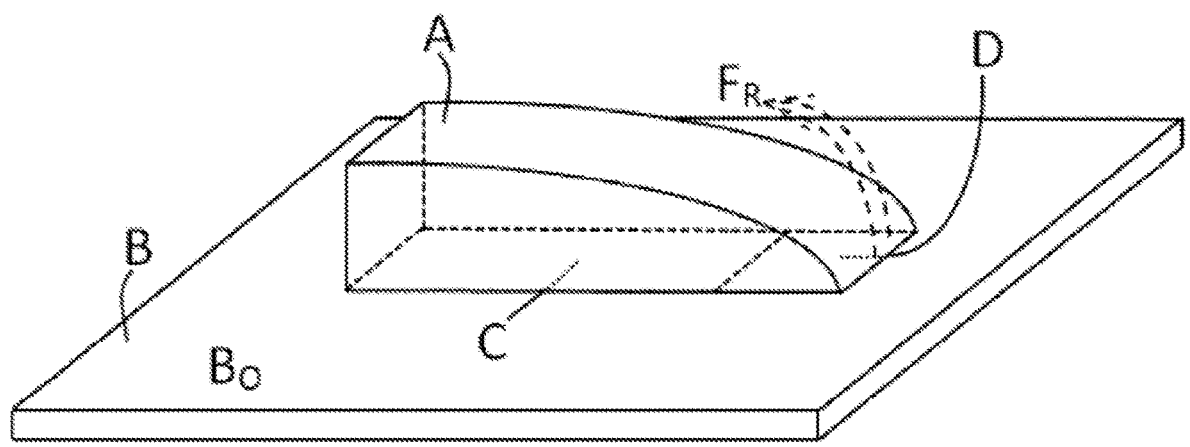
FIG. 2 depicts a foam body adhered to a plastic substrate.

C) Adhesion to Polypropylene (Adhesive Bonding of Foam Substrates to Polypropylene Substrates):

As test material, Recticel® T 20120 PU foam bodies from Recticel having a foam density of 20 kg/m³ and the dimensions 10×5×3 cm (FIGS. 1 and 2, (A)) and PP-DWST polypropylene plastics substrates from SIMONA AG having the dimensions 20×10×0.4 cm (FIGS. 1 and 2, (B)) are used. Adhesive is applied by means of the spray coagulation process (application rate 130-150 g/m² wet) in the case of the polypropylene substrate to the entire surface of the top side (20×10 cm) (FIGS. 1 and 2, (Bo)) and in the case of the foam substrate to the entire surface of the bottom side (10×5 cm) (FIGS. 1 and 2, (C)) and additionally to a short edge face (5×3 cm) (FIGS. 1 and 2, (D)).

After application of the adhesive, the foam is joined to the polypropylene. For this purpose, the surface (C), which has been provided with adhesive, of the foam is joined to the side, which has had adhesive applied, of the polypropylene by hand with slight pressure (FIGS. 1 and 2, (C) against (Bo)). Then, the edge face, which has been provided with adhesive, of the foam (FIG. 1, (D)) is likewise joined by hand with slight pressure (FIG. 1, (F)) to the coated side of the polypropylene (FIG. 2, (D)), so that the foam test specimen is under high strain in the region of the joined edge face (D) and the surface (A) as a result of the restoring force (FIG. 2, (FR)).

The adhesion is assessed after storage of the test specimen for 24 hours at room temperature: If the joined edge face (FIG. 2, (D)) of the foam substrate (FIG. 2, (A)) detaches again from the surface (FIG. 2 Bo)) of the polypropylene substrate (FIGS. 1 and 2, (B)) immediately in the wet state, or during or after drying, no sufficient adhesion is present.

D) Ascertaining the Glass Transition Temperatures, Melting Temperatures and Enthalpies of Fusion by Means of DSC:

The glass transition temperatures and also melting temperatures and enthalpies of fusion were determined by means of differential scanning calorimetry (DSC) using a Pyris Diamond DSC calorimeter from Perkin-Elmer. To this end, a film was produced by knife coating the dispersion onto a glass sheet at a 100 µm wet film thickness, flashed off for 2 hours, and then this film together with the glass sheet is dried in a dry box for 3 days at room temperature and 0% relative room humidity. Then, using 10 mg of sample material from this film, the DSC curve is recorded with the following measurement conditions: Rapid cooling to the starting temperature −100° C., then commencement of three heatings from −100° C. to +150° C. at a heating rate of 20 K/min and a cooling rate of 320 K/min under a helium atmosphere and with cooling with liquid nitrogen. The glass transition temperature corresponds to the temperature at half the height of the glass transition, with the third heating being assessed. For determination of the melting temperatures and enthalpies of fusion, the first heating was assessed.

E) Feedstocks

Polyester I: polyester diol formed from butane-1,4-diol and adipic acid having an OH number=50

Polyester II: polyester diol formed from hexane-1,6-diol and phthalic anhydride having an OH number=56

Desmodur® H: hexamethylene 1,6-diisocyanate (Covestro Deutschland AG, Leverkusen/Germany)

Desmodur® I: isophorone diisocyanate (Covestro Deutschland AG, Leverkusen/Germany)

Luphen® DDS 3548: epoxy resin-modified polyurethane dispersion from BASF AG, Ludwigshafen/Germany, having a solids content of 45% by weight. The polymer present is semicrystalline after drying with a melting temperature of 41.5° C. and an enthalpy of fusion of 34.4 J/g.

Desavin®: di(phenoxyethyl) formal (Covestro Deutschland AG, Leverkusen/Germany) (plasticizer resin)

DBT: di-n-butyl terephthalate (Eastman, Kingsport/US) (plasticizer resin)

Synegis® 9100: dipropylene glycol dibenzoate (Synegis, Mont-Saint-Guibert/Belgium) (plasticizer resin)

Aquatac® XR-4343: aqueous rosin ester dispersion having 60% by weight solids content (Kraton Corporation, Almere/the Netherlands) (tackifier resin)

Example 1

Preparation of an aqueous polyurethane or polyurethane-urea dispersion.

450 g of polyester I are dewatered for 1 hour at 110° C. and 15 mbar. At 80° C., 30.11 g of Desmodur® H and then 20.14 g of Desmodur® I are added. The mixture is stirred at 80 to 90° C. until a constant isocyanate content of 1.15% by weight has been reached. The reaction mixture is dissolved in 750 g of acetone and cooled to 48° C. Into the homogeneous solution is added a solution of 5.95 g of the sodium salt of N-(2-aminoethyl)-2-aminoethanesulfonic acid and 2.57 g of diethanolamine in 65 g of water with vigorous stirring. After 30 minutes, the mixture is dispersed by addition of 700 g of water. Distillative removal of the acetone affords an aqueous polyurethane-polyurea dispersion having a solids content of 40.0% by weight.

The polymer present is semicrystalline after drying with a melting temperature of 48° C. and an enthalpy of fusion of 50.4 J/g.

Example 2

Preparation of an aqueous polyurethane or polyurethane-urea dispersion.

798.3 g of polyester I are dewatered for 1 hour at 110° C. and 15 mbar. Then, at 80° C., 13.5 g of butane-1,4-diol and 157.0 g of Desmodur® I are added and the mixture is stirred at 90 to 100° C. until a constant isocyanate content of 1.72% has been reached. The reaction mixture is dissolved in 1450 g of acetone and cooled to 48° C. Into the homogeneous solution is added a solution of 16.5 g of the sodium salt of N-(2-aminoethyl)-2-aminoethanesulfonic acid and 7.7 g of diethanolamine in 195 g of water with stirring, and the mixture is stirred at 48° C. for a further 30 minutes. The mixture is then dispersed by addition of 1440 g of water with vigorous stirring. Distillative removal of the acetone affords an aqueous polyurethane-polyurea dispersion having a solids content of 38.0% by weight.

The polymer present is semicrystalline after drying with a melting temperature of 49.8° C. and an enthalpy of fusion of 45.9 J/g.

Example 3

Preparation of an aqueous polyurethane or polyurethane-urea dispersion.

1215 g of polyester II are dewatered for 1 hour at 110° C. and 15 mbar. At 80° C., 4.6 g of hexane-1,6-diol and 179.0 g of Desmodur® H are added and the mixture is stirred at 90° C. until a constant isocyanate content of 2.28% by weight has been reached. The reaction mixture is dissolved in 2490 g of acetone and cooled to 48° C. Into the homogeneous solution is added a solution of 31.9 g of the sodium salt of N-(2-aminoethyl)-2-aminoethanesulfonic acid in 300 g of water with vigorous stirring. After 30 minutes, the mixture is dispersed by addition of 1150 g of water. Distillative removal of the acetone affords an aqueous polyurethane-polyurea dispersion having a solids content of 50.0% by weight.

The polymer present is amorphous after drying (does not have a melting peak in DSC).

Example 4: (Comparison)

Determination of the initial strength and the adhesion to polypropylene with the dispersion from example 1: the adhesion to polypropylene is insufficient (see table 1).

Example 5: (Comparison)

Preparation of a formulation formed from the PUD from Example 1 and a tackifier resin dispersion, and determination of the initial strength and the adhesion to polypropylene.

To 91.7 g of the polyurethane dispersion from Example 1 are added 8.3 g of Aquatac® XR-4343 with vigorous stirring using a disk stirrer, the mixture is stirred for a further 4 h and subsequently stored for 12 h at room temperature. Based on the solids content, the formulation contains 88.0% by weight of polyurethane polymer and 12.0% by weight of tackifier resin.

The initial strength and the adhesion to polypropylene are determined with the formulation: the adhesion to polypropylene is insufficient (see table 1).

Example 6: (Comparison)

Preparation of a formulation formed from the PUD from Example 1 and a plasticizer resin, and determination of the initial strength and the adhesion to polypropylene.

To 92.7 g of the polyurethane dispersion from Example 1 are added 7.3 g of Desavin® with vigorous stirring using a disk stirrer, the mixture is stirred for a further 4 h and subsequently stored for 12 h at room temperature. Based on the solids content, the formulation contains 83.6% by weight of polyurethane polymer and 16.4% by weight of plasticizer resin.

The initial strength and the adhesion to polypropylene are determined with the formulation: the adhesion to polypropylene is insufficient (see table 1).

Example 7: (Comparison)

Preparation of a formulation formed from the PUD from Example 1 and a plasticizer resin, and determination of the initial strength and the adhesion to polypropylene.

To 93.5 g of the polyurethane dispersion from Example 1 are added 6.5 g of Synegis® 9100 with vigorous stirring using a disk stirrer, the mixture is stirred for a further 4 h and subsequently stored for 12 h at room temperature. Based on the solids content, the formulation contains 85.2% by weight of polyurethane polymer and 14.8% by weight of plasticizer resin.

The initial strength and the adhesion to polypropylene are determined with the formulation: the adhesion to polypropylene is insufficient (see table 1).

Example 8: (According to the Invention)

Preparation of a formulation formed from the PUD from Example 1, a tackifier resin and a plasticizer resin, and determination of the initial strength and the adhesion to polypropylene.

To 85.6 g of the polyurethane dispersion from Example 1 are added in succession 7.7 g of Aquatac® XR-4343 and 6.7 g of Desavin® with vigorous stirring using a disk stirrer, the mixture is stirred for a further 4 h and subsequently stored for 12 h at room temperature. Based on the solids content, the formulation contains 75.2% by weight of polyurethane polymer, 10.1% by weight of tackifier resin and 14.7% by weight of plasticizer resin.

The initial strength and the adhesion to polypropylene are determined with the formulation: both the initial strength and the adhesion to polypropylene are good (see table 1).

Example 9: (According to the Invention)

Preparation of a formulation formed from the PUD from Example 1, a tackifier resin and a plasticizer resin, and determination of the initial strength and the adhesion to polypropylene.

To 85.6 g of the polyurethane dispersion from Example 1 are added in succession 7.7 g of Aquatac® XR-4343 and 6.7 g of DBT with vigorous stirring using a disk stirrer, the mixture is stirred for a further 4 h and subsequently stored for 12 h at room temperature. Based on the solids content, the formulation contains 75.2% by weight of polyurethane polymer, 10.1% by weight of tackifier resin and 14.7% by weight of plasticizer resin.

The initial strength and the adhesion to polypropylene are determined with the formulation: both the initial strength and the adhesion to polypropylene are good (see table 1).

Example 10: (According to the Invention)

Preparation of a formulation formed from the PUD from Example 1, a tackifier resin and a plasticizer resin, and determination of the initial strength and the adhesion to polypropylene.

To 84.0 g of the polyurethane dispersion from Example 1 are added in succession 9.0 g of Aquatac® XR-4343 and 7.0 g of Synegis® 9100 with vigorous stirring using a disk stirrer, the mixture is stirred for a further 4 h and subsequently stored for 12 h at room temperature. Based on the solids content, the formulation contains 73.0% by weight of polyurethane polymer, 11.7% by weight of tackifier resin and 15.2% by weight of plasticizer resin.

The initial strength and the adhesion to polypropylene are determined with the formulation: both the initial strength and the adhesion to polypropylene are good (see table 1).

Example 11: (According to the Invention)

Preparation of a formulation formed from the PUD from Example 2, a tackifier resin and a plasticizer resin, and determination of the initial strength and the adhesion to polypropylene.

To 87.0 g of the polyurethane dispersion from Example 2 are added in succession 8.7 g of Aquatac® XR-4343 and 4.3 g of Desavin® with vigorous stirring using a disk stirrer, the mixture is stirred for a further 4 h and subsequently stored for 12 h at room temperature. Based on the solids content, the formulation contains 77.6% by weight of polyurethane polymer, 12.3% by weight of tackifier resin and 10.1% by weight of plasticizer resin.

The initial strength and the adhesion to polypropylene are determined with the formulation: both the initial strength and the adhesion to polypropylene are good (see table 1).

Example 12: (Comparison)

Preparation of a formulation formed from the PUD from Example 1, a tackifier resin and a plasticizer resin, and determination of the initial strength and the adhesion to polypropylene.

To 78.0 g of the polyurethane dispersion from Example 1 are added in succession 9.0 g of Aquatac® XR-4343 and 13.0 g of Synegis® 9100 with vigorous stirring using a disk stirrer, the mixture is stirred for a further 4 h and subsequently stored for 12 h at room temperature. Based on the solids content, the formulation contains 62.9% by weight of polyurethane polymer, 10.9% by weight of tackifier resin and 26.2% by weight of plasticizer resin.

The initial strength and the adhesion to polypropylene are determined with the formulation: the adhesion to polypropylene is insufficient (see table 1).

Example 13: (Comparison)

Determination of the initial strength and the adhesion to polypropylene with the dispersion from example 3: both the initial strength and the adhesion to polypropylene are insufficient (see table 1).

Example 14: (Comparison)

Preparation of a formulation formed from the PUD from Example 3, a tackifier resin and a plasticizer resin, and determination of the initial strength and the adhesion to polypropylene.

To 82.7 g of the polyurethane dispersion from Example 3 are added in succession 9.3 g of Aquatac® XR-4343 and 5.0 g of Desavin® with vigorous stirring using a disk stirrer, the mixture is stirred for a further 4 h and subsequently stored for 12 h at room temperature. Based on the solids content, the formulation contains 79.6% by weight of polyurethane polymer, 11.8% by weight of tackifier resin and 9.6% by weight of plasticizer resin.

The initial strength and the adhesion to polypropylene are determined with the formulation: both the initial strength and the adhesion to polypropylene are insufficient (see table 1).

Example 15: (Comparison)

Determination of the initial strength and the adhesion to polypropylene with Luphen® DDS 3548: both the initial strength and the adhesion to polypropylene are insufficient (see table 1).

Example 16: (Comparison)

Preparation of a formulation formed from Luphen® DDS 3548, a tackifier resin and a plasticizer resin, and determination of the initial strength and the adhesion to polypropylene.

To 83.9 g of Luphen® DDS 3548 are added in succession 8.6 g of Aquatac® XR-4343 and 7.5 g of Desavin® with vigorous stirring using a disk stirrer, the mixture is stirred for a further 4 h and subsequently stored for 12 h at room temperature. Based on the solids content, the formulation contains 74.9% by weight of the Luphen® DDS 3548 polymer, 10.2% by weight of tackifier resin and 14.9% by weight of plasticizer resin.

The initial strength and the adhesion to polypropylene are determined with the formulation: both the initial strength and the adhesion to polypropylene are insufficient (see table 1).

TABLE 1

Evaluation of the examples according to the invention and the comparative examples

| Example | Composition | Initial strength (test method B) | Adhesion to PP (test method C) |
| --- | --- | --- | --- |
| 4 (comparison) | PUD from ex. 1 | yes | no |
| 5 (comparison) | PUD from ex. 1, Aquatac ® XR-4343 | yes | no |
| 6 (comparison) | PUD from ex. 1 Desavin ® | yes | no |
| 7 (comparison) | PUD from ex. 1 Synegis ® 9100 | yes | no |
| 8 (according to the invention) | PUD from ex. 1, Aquatac ® XR-4343, Desavin ® | yes | yes |
| 9 (according to the invention) | PUD from ex. 1, Aquatac ® XR-4343, DBT | yes | yes |
| 10 (according to the invention) | PUD from ex. 1, Aquatac ® XR-4343, Synegis ® 9100 | yes | yes |
| 11 (according to the invention) | PUD from ex. 2, Aquatac ® XR-4343, Desavin ® | yes | yes |
| 12 (comparison) | PUD from ex. 1, Aquatac ® XR-4343, Synegis 200 9100 | yes | no |
| 13 (comparison) | PUD from ex. 3 | no | no |
| 14 (comparison) | PUD from ex. 3, Aquatac ® XR-4343, Desavin ® | no | no |
| 15 (comparison) | Luphen ® DDS 3548 | no | no |
| 16 (comparison) | Luphen ® DDS 3548, Aquatac ® XR-4343, Desavin ® | no | no |

The invention claimed is:

1. A process for adhesively bonding substrates by mixing a formulation with a coagulant in a two-component spray gun, wherein the coagulant is conveyed separately into the two-component spray gun and is mixed in a spray jet and the coagulation of the dispersion in the spray jet takes place on a path to a surface of a first substrate, on impact with said substrate forms a film which is immediately tacky in a still-wet state and in the wet state a second surface is immediately joined, optionally with pressure on the substrate towards an adhesive surface, wherein the formulation comprises:
I. an aqueous polyurethane or polyurethane-urea dispersion, containing as disperse phase a polymer A) which after drying is semicrystalline or crystalline and has a melting temperature in a range from 30 to 80° C. and an enthalpy of fusion of ≥35 J/g,
II. at least one plasticizer resin B),
III. at least one tackifier resin C),
wherein the formulation, based on the total formulation solids, comprises
60%-90% by weight of polymer A),
5%-20% by weight of plasticizer resin B) and
5%-20% by weight of tackifier resin C), and
wherein the formulation comprises from 40% to 85% by weight of water.

2. The method as claimed in claim 1, wherein the aqueous polyurethane or polyurethane-urea dispersion does not contain an external emulsifier.

3. The method as claimed in claim 1, wherein the formulation, based on the total formulation solids, comprises
66%-85% by weight of polymer A),
8%-18% by weight of plasticizer resin B) and
7%-16% by weight of tackifier resin C).

4. The method as claimed in claim 1, wherein the formulation, based on the total formulation solids, comprises
70%-81% by weight of polymer A),
10%-16% by weight of plasticizer resin B) and
9%-14% by weight of tackifier resin C).

5. The method as claimed in claim 1, wherein the formulation, based on the total formulation solids, comprises
72%-80% by weight of polymer A),
10%-15.5% by weight of plasticizer resin B) and
10%-12.5% by weight of tackifier resin C).

6. The method as claimed in claim 1, wherein the polymer A), after drying, is semicrystalline or crystalline and has a melting temperature in the range from 35° C. to 80° C.

7. The method as claimed in claim 1, wherein the polymer A), after drying, is semicrystalline or crystalline and has an enthalpy of fusion of ≥35 J/g.

8. The method as claimed in claim 1, wherein the plasticizer B) comprises non-volatile, low molecular weight compounds bearing polar groups.

9. The method as claimed in claim 1, wherein the tackifier resin C) comprises a rosin, and/or a modified rosins.

* * * * *